United States Patent
Schwalb

(10) Patent No.: US 7,877,403 B2
(45) Date of Patent: Jan. 25, 2011

(54) SYSTEM AND METHOD FOR DATABASE SEARCHING USING FUZZY RULES

(75) Inventor: Edward M. Schwalb, Irvine, CA (US)

(73) Assignee: Data Trace Information Services, LLC, Santa Ana, CA (US)

( * ) Notice: Subject to any disclaimer, the term of this patent is extended or adjusted under 35 U.S.C. 154(b) by 369 days.

(21) Appl. No.: 11/751,186

(22) Filed: May 21, 2007

(65) Prior Publication Data

US 2008/0294616 A1  Nov. 27, 2008

(51) Int. Cl.
*G06F 7/00* (2006.01)
(52) U.S. Cl. .......................... 707/767; 704/9
(58) Field of Classification Search .............. None
See application file for complete search history.

(56) References Cited

U.S. PATENT DOCUMENTS 5,369,577 A * 11/1994 Kadashevich et al. .......... 704/9
2004/0139072 A1 * 7/2004 Broder et al. .................. 707/4
2007/0011154 A1 * 1/2007 Musgrove et al. .............. 707/5
2007/0179776 A1 * 8/2007 Segond et al. ................. 704/9

OTHER PUBLICATIONS

Oshika et al., "Computational Techniques for Improved Name Search," Proceedings of the Second Conference on Applied Natural Language Processing, 1988.*

* cited by examiner

*Primary Examiner*—Tim T. Vo
*Assistant Examiner*—Aaron Sanders
(74) *Attorney, Agent, or Firm*—Snell & Wilmer L.L.P.

(57) ABSTRACT

An apparatus and method for database searching using fuzzy rules is presented. The apparatus and method may accept a word or word phrase such as a persons name and returns fuzzy rules for database searching. Applicable search rules are selected and word or word phrase equivalents are displayed to a user. The user accepts or rejects each of the word or word phrase. The word or word phrase along with the user's acceptance or rejection are stored in a sample database. The fuzzy rules are modified according to the data in the sample database. The database is filtered by training and testing portions of the database for accuracy and purging the least accurate portions.

16 Claims, 5 Drawing Sheets

SYSTEM AND METHOD FOR DATABASE SEARCHING USING FUZZY RULES

BACKGROUND

1. Field of the Invention

The present invention relates to database searches. More particularly, the present invention relates to the application of fuzzy rules to database searches.

2. Related Art

Electronic database records are often indexed by keywords or phrases that aid search engines in locating documents. These keywords or phrases occasionally have alternate spellings, alternate word orderings, or multiple spellings. For example, the keyword or phrase may be a person's name. In some instances, a data entry person may enter the name incorrectly into an electronic database by misspelling the name or by an inadvertent word reordering. For example, Bill Smith may be incorrectly spelled as Bill Smitth or Tam Nguyen may be incorrectly entered as Nguyen Tam. A simple word phrase search of an electronic database for Bill Smith or Tam Nguyen may end up producing poor results because of the incorrectly spelled Bill Smitth or incorrectly entered Nguyen Tam.

Electronic name searches are particularly difficult since computers do not normally apply the intuitive rules which people apply when they deal with names. A person named Joe Smith may also be known as Joseph Smith, Joseph A. Smith, Joseph Allen Smith, Joseph Allen Smith III, Joey Smith, etc. Some surnames are translations from languages without an equivalent alphabet and may be spelled phonetically in a variety of ways. Social customs in some countries may dictate that the surname be listed first and the given name last. A person from one of these countries may be referred to differently depending on which social custom they happen to be observing at the time.

Similar problems exist with searching electronic databases for addresses. A particular address may, for example, have been subject to a zip code change or a street renaming. A particular address may also be located in one municipality for tax purposes and another municipality for mail service. Searches of an electronic database using the current street address may lead to misleading or inaccurate results depending on the purpose of the search.

Many database search programs use fuzzy search algorithms which include phonetic matching and variation generators to expand the name search from a simple name to include name equivalents. A problem with these name search algorithms is that they are overbroad for some applications and too narrow for others. The algorithms generally only capture the explicit knowledge of the developer and do not capture the knowledge and work patterns of individuals in specific industries.

Many industries have a large economic interest in being able to execute fuzzy electronic data searches customized to their industry. For example, title search companies may have an interest in searching recording databases for outstanding mortgages or a chain of title. These searches are frequently conducted by an abstractor who may employ many definitive and intuitive rules, acquired through years of experience, in searching for the relevant documents. The searches are time consuming and the abstractor may have to make many searches to acquire all the relevant documents. Since the abstractor's search skills are partly intuitive, the accuracy of the search is dependent on the experience of the abstractor. Capturing the explicit and intuitive knowledge of a skilled abstractor may be of significant economic interest in the title search industry.

Accordingly, there is a general need for a system and method of document retrieval that uses fuzzy rules that are adaptable to the needs of a specific industry, application or user. Applicant's invention addresses this need as well as others.

SUMMARY

According to the present invention, a computer (or computer software) is supplied with fuzzy rules for conducting index or keyword searches. An index or keyword is also supplied to a computer. The computer executes a search on the index or keyword using fuzzy rules. The results of the search are presented to a user. The user accepts or rejects each of the search results. The selected search rules as well as the search results are saved as a historic search sample in a database. The fuzzy rules are modified according to the historic search samples in the database. This process may train the computer. The computer learns by adapting its fuzzy rules to generalize the training examples specified by the users. The computer learns the intuitive search knowledge of the user over time.

To avoid unbounded acquisition of new samples, the present invention filters the sample database and removes the least informative samples. The database is filtered by partitioning the database into one or more datasets. Each dataset is then further partitioned into a training sample subset and a testing sample subset. The training samples in each of the datasets or partitions are then used to train a corresponding fuzzy rule set. The testing samples in each of the datasets or partitions are then used to estimate the accuracy of the newly trained fuzzy rule sets. The least accurate rule set or sets may then be purged from the database. Thus, the database is systematically purged of the least accurate data samples creating room in the database for more representative data samples.

BRIEF DESCRIPTION OF THE DRAWINGS

The features, objects, and advantages of the present invention will become more apparent from the detailed description set forth below when taken in conjunction with the drawings, wherein.

DETAILED DESCRIPTION

The method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The processor may be any processing device such as a controller, a microprocessor, a software and/or hardware module, etc.

Figure 1:
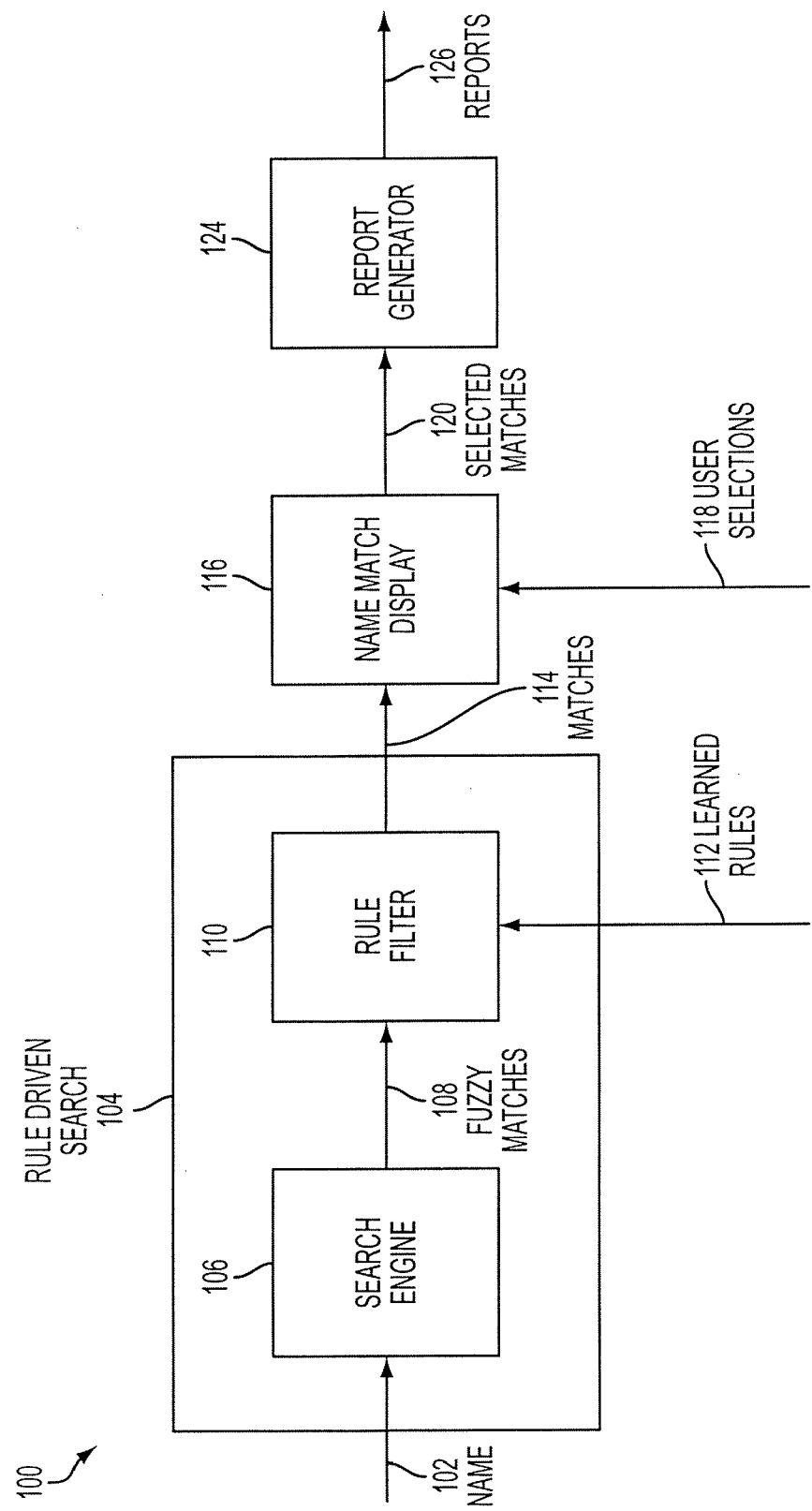
FIG. 1 shows a block diagram of a training view of a fuzzy name search apparatus according to an embodiment of the present invention.

FIG. 1 shows a block diagram of a training view of a fuzzy name search apparatus 100 according to an embodiment of the present invention. A name or phrase 102 may be entered or input into a computer (e.g., a desktop, PDA, cell phone, software and/or hardware module, etc.) that performs a rule driven search 104. The rule driven search 104 may search databases (e.g., third party databases or local databases), the Internet, etc. for information related to the name or phrase 102. A search engine 106 using fuzzy name search rules identifies fuzzy matches 108. The fuzzy matches 108 are passed through a rule filter 110 that filters the fuzzy matches 108 by applying learned rules 112. The rule filter 110 outputs one or more matches 114 that are displayed on a name match display 116 for a user to make match selections. The user may use a touch pad, a touch screen or a keyboard to make the match selections. The selected matches 120 are input into a report generator 124. The report generator 124 generates appropriate reports 126.

For example, the user may wish to search a database for encumbrances on a property at 1135A Greenacre Drive. The user may enter the name or address 102 as 1135 Greenacre Drive into a computer to perform a rule driven search 104. The search engine 106 may return a number of fuzzy matches such as 1135A Green Acre Drive, 1125A Green Acre Drive, 1135 Greenacre Cove, 1135B Greenacre, etc. The rule filter 110 would then filter the names using learned rules 112. The learned rules 112 may include a number of rules such as reject all addresses having less than a perfect match for a street number. In the example, the address 1125A Green Acre Drive would be filtered out by the rule filter 110 because it does not have a perfect match for the street number. The matches 114 may be displayed on the name match display 116 for the user to select the matches 114 the user desires. The user may, for example, realize that Greenacre and Green Acre are alternate spellings of the same street. The user may therefore select the match 1135B Greenacre among other matches the user finds relevant.

Figure 2:
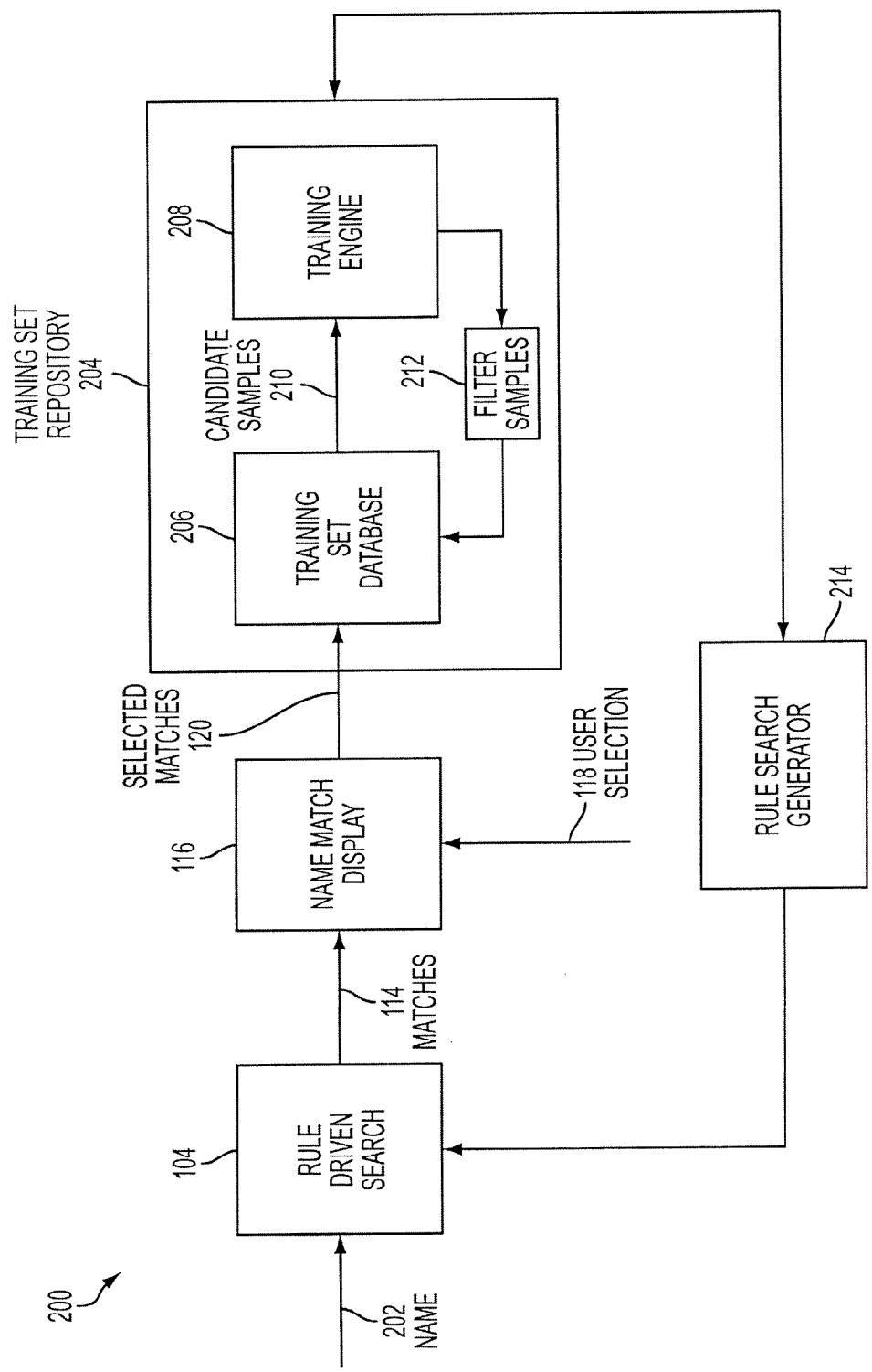
FIG. 2 shows a block diagram of a learning view of a fuzzy name search apparatus according to an embodiment of the present invention.

FIG. 2 shows a block diagram of a learning view of a fuzzy name search apparatus 200 according to an embodiment of the present invention. A name or phrase 202 is entered or input into a computer that performs a rule driven search 104. The rule driven search 104 may search databases (e.g., third party databases or local databases), the Internet, etc. for information related to the name or phrase 202. The rule driven search 104 results in matches 114 that are displayed on a name match display 116 for a user to make match selections. The name match display 116 displays all fuzzy logic matches. The learned rules 112 (shown in FIG. 1 as being a part of the rule driven search 104) may be applied with any proposed filtered matches displayed to the user as "stricken" matches. The user may accept or reject any of the fuzzy logic matches including the "stricken" matches.

The user selections 118 are forwarded as selected matches 120 to a training set repository 204. The training set repository 204 may include a training set database 206, which stores the selected matches. The training set repository 204 may also include a training engine 208 that receives candidate samples 210 from the training set database 206. The training engine 208 identifies the candidate samples 210 that should be filtered from the training set database 206. The candidate samples 210, identified to be filtered, are filtered using a filter 212. The training set repository 204 also feeds a rule search generator 214 that modifies the search rules for subsequent rule driven searches 104 and sample management functions (explained hereinafter) of the training set repository 204.

The learning view of the fuzzy name search apparatus 200 has at least two components that distinguish it from the training view of the fuzzy name search apparatus 100. The first component is the training set repository 204. The training set repository 204 has a training set database 206 that stores user choices. The training set database 206 provides the information needed to allow the fuzzy name search apparatus 200 to learn.

The second component is the rule search generator 214. The rule search generator 214 uses the training set database 206 to modify the fuzzy search rules based on user selections. The rule search generator 214 modifies the rules based on user selections. The rules are updated for future searches and to select historic samples for elimination.

Figure 3:
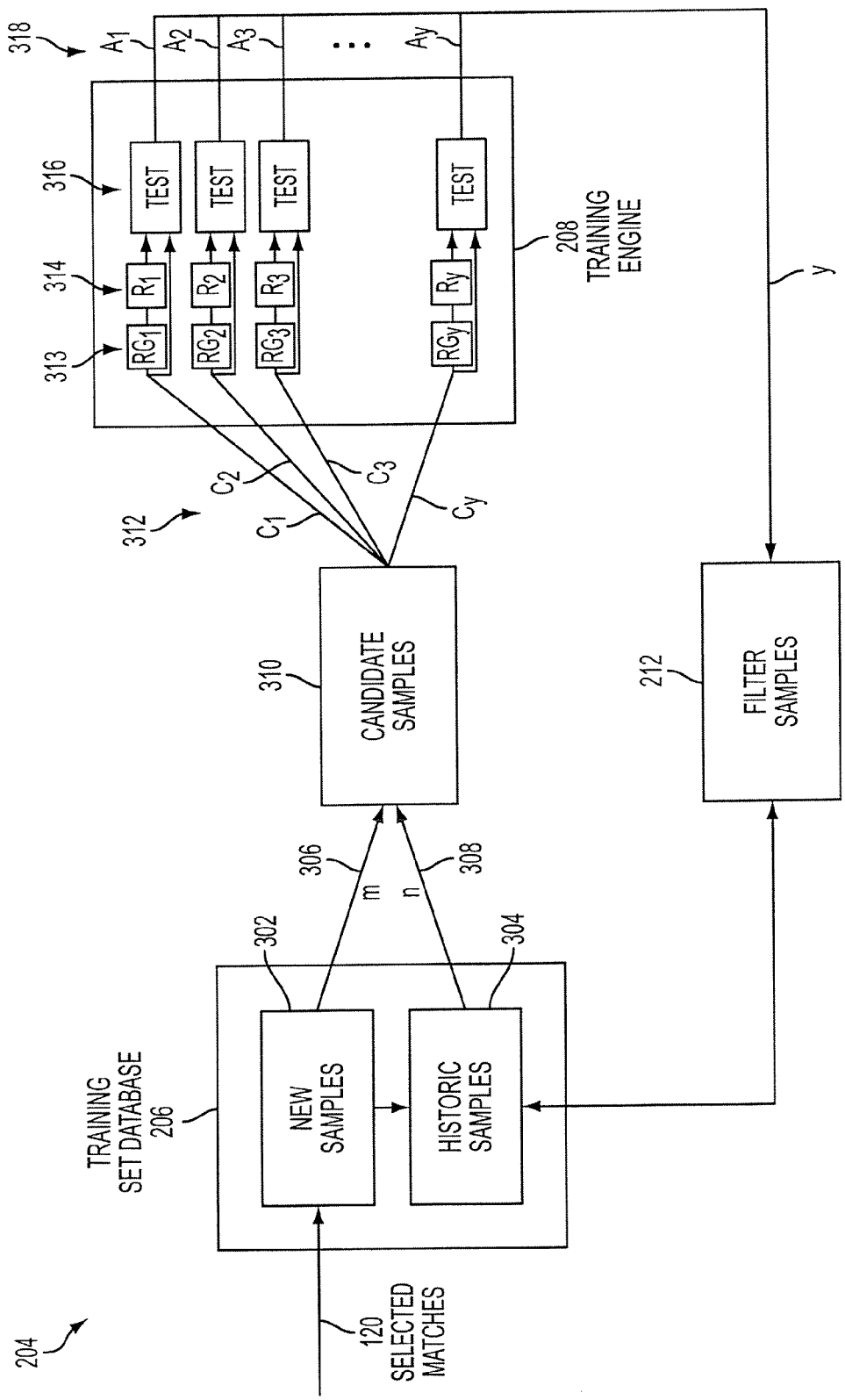
FIG. 3 shows a block diagram of the training set repository of FIG. 2 according to an embodiment of the present invention.

FIG. 3 shows a block diagram of the training set repository 204 of FIG. 2 according to an embodiment of the present invention. The selected matches 120 are input into a new samples module 302 of the training set database 206. The new samples module 302 of the training set database 206 sends the selected matches 120 to a historic samples module 304 of the training set database 206. At various times, m samples 306 from the new samples module 302 and n samples 308 from the historic samples module 304 are selected as candidate samples 310 for elimination from the training set database 206. The candidate samples 310 are partitioned into y partitions 312 that are inputs to the training engine 208. The training engine 208 receives search rules 314 from the rule search generator 214. The search rules 314 are replicated y times.

The candidate sample partitions 312 are further partitioned into training samples that are used to train respective rule sets $R_1$ to $R_y$, 314 using machine learning algorithms $RG_1$ to $RG_y$, 313 and testing samples that are inputs to respective test databases 316. The training engine 208 applies cross validation techniques to estimate the accuracy of the learning for each candidate sample partition 312. The candidate sample partition 312 with the most accurate learning is retained as the new training set. For example, if the training set contains 11,000 samples, 10 subsets of 10,000 samples each are generated, training and cross validation is performed using each partition, and the accuracy is calculated for each of the 10 partitions. The 10,000 samples of the partition with best accuracy are retained as the new training set, thus reducing the total number of samples from 11,000 down to 10,000. The training engine 208 uses the test samples to generate accuracy indices $A_1$ to $A_y$, 318. The accuracy indices 318 are used by the training set repository 204 to filter samples 212 from the historic samples module 304 of the training set database 206.

Figure 4:
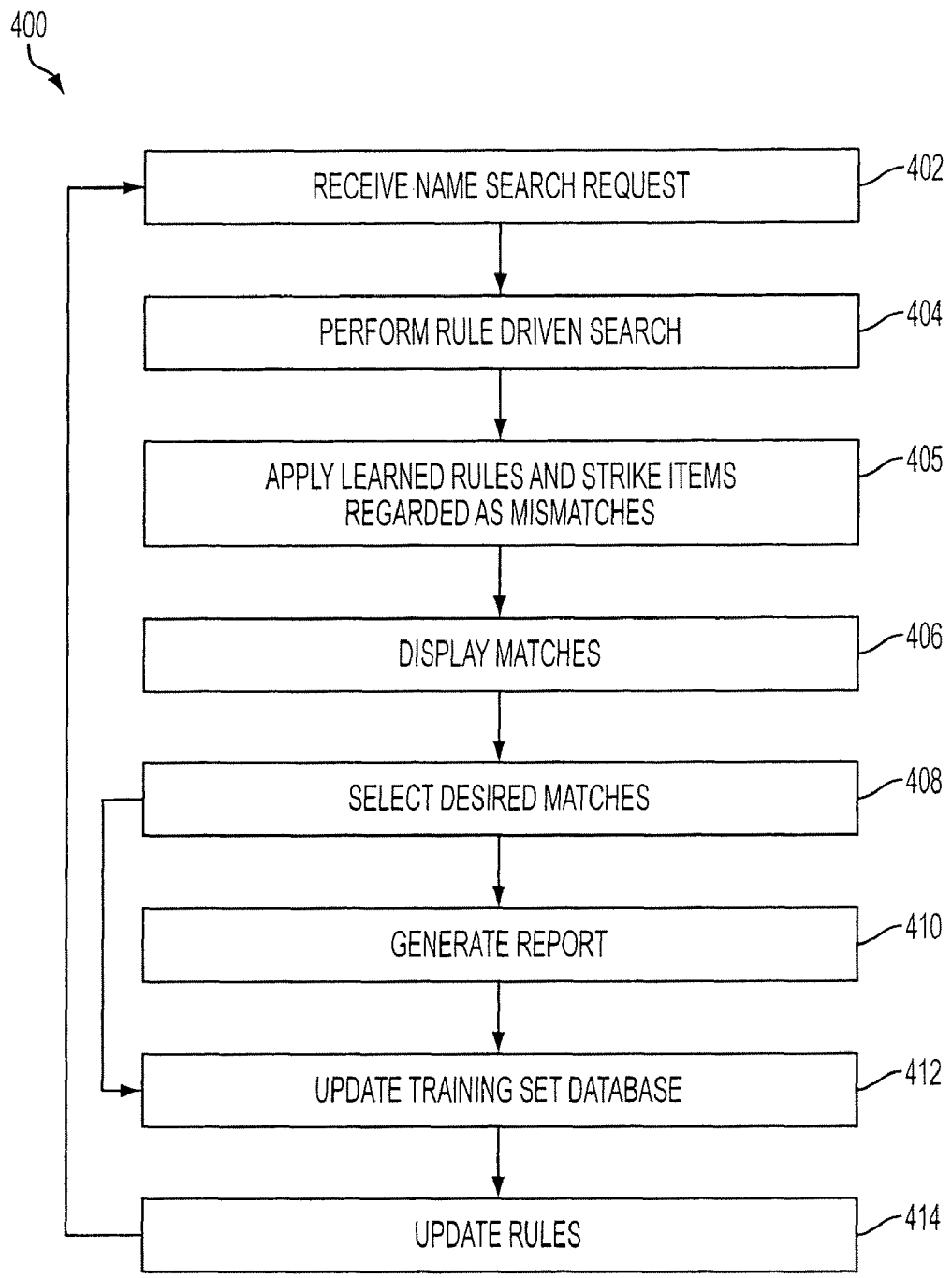
FIG. 4 shows a flow diagram of a method of searching a database using fuzzy rules according to an embodiment of the present invention.

FIG. 4 shows a flow diagram of a method of searching a database using fuzzy rules according to an embodiment of the present invention. First, a name search request is received for a fuzzy name search (402). The name may be a person's name, an address, a zip code, any combination thereof, or any word or word phrase for searching a database. The name may also include search attributes for searching a relational database. User attributes, application attributes or any other indicia on which machine learning may be accomplished may also be received. The name or other data may be received in a digital computer or equivalent. Rules may also be presented to the user for selection. The rules may, for example, have rules that return all matches having common nicknames for a given name.

A rule driven search may also be performed (404). Learned rules are applied and items regarded as potential mismatches are "stricken" (405). The matches may be displayed on a display screen (406). For example, the search may have been on Richard James and the fuzzy results show records for equivalent names such as Ricky James, Rick James, Rich James, James Richard, James Richards, Jimmy Richards, Jimmy Rick, etc. Some of the matches may be stricken based on application of learned rules. The user may then select the desired matches "stricken" or not (408). For example, the user may decide that records for Ricky James, Rick James, Rich James, and James Richard are likely to be relevant while those for James Richards, Jimmy Richards and Jimmy Rick are likely to be irrelevant.

A search report may then be generated (410). The search reports may be tailored to a particular industry such as the title search industry. The search reports may, for example, contain chain of title information or recorded land encumbrances for each relevant record.

The training set database 206 may be updated with the user selections (412). The search rules may then be updated (414) according to the user selections and historic user selections stored in the training set database 206. For example, it may be noted that for virtually all of the samples in the training set database 206, the user has selected all equivalent names: 1) where a nickname associated with the given name is used with the correct last name and 2) where the first name and the last name have been transposed have been selected; but the user has rejected all equivalent names with a nickname and the last name where the nickname and the equivalent name have been transposed. In this case, the system may learn a new rule or set of rules.

Figure 5:
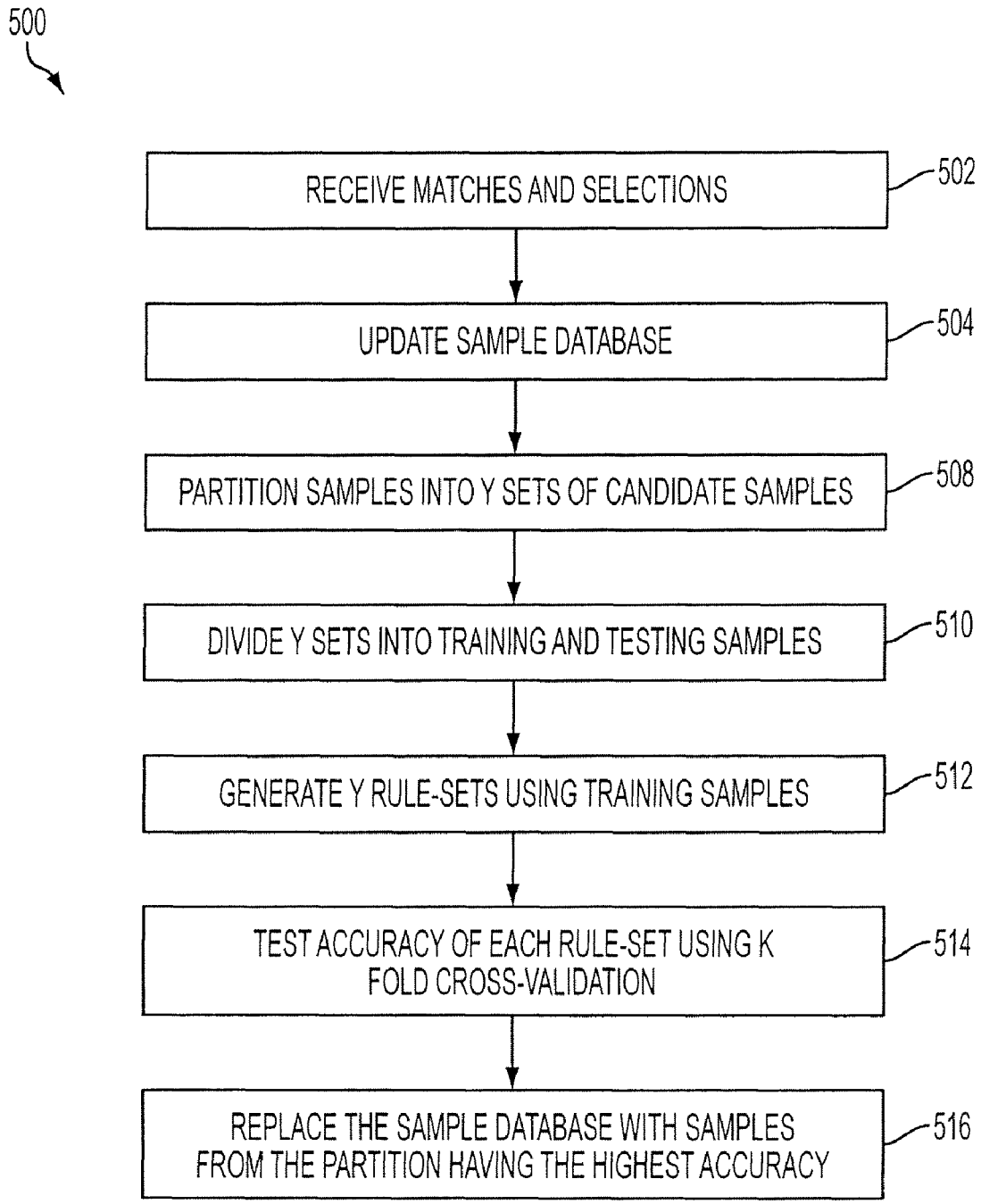
FIG. 5 shows a flow diagram of a method of filtering or refreshing a fuzzy search training set repository according to an embodiment of the present invention.

FIG. 5 shows a flow diagram of a method of filtering or refreshing a fuzzy search training set repository according to an embodiment of the present invention. Matches and user selections are received (502). The matches and user selections may be used to update a sample database (504). The database may store search samples, user selections, and any applicable attributes of the fuzzy matches or the search. The sample database may contain historic as well as new samples.

The candidate samples 310 may be partitioned into Y sets of candidate samples (508). Each of the Y sets may contain the target maximum number of samples configured for the system. Each sample set may be further partitioned or divided into training and testing samples (510). A set of Y test rule sets may be created. Y copies of the rule set may be generated. Each of the rule sets may be trained using respective training samples. The training engine 208 may generate Y trained rule sets using the Y training samples (512). The accuracy of each trained rule-set may be tested using k-fold accuracy validation or cross-validation (514). The sample database may then be replaced with samples from the partition having the highest accuracy (516).

The description of the disclosed examples is provided to enable any person of ordinary skill in the art to make and use the disclosed methods and apparatus. Various modifications to these examples will be readily apparent to those skilled in the art, and the principles defined herein may be applied to other examples without departing from the spirit and scope of the disclosed method and apparatus. The described embodiments are to be considered in all respects only as illustrative and not restrictive and the scope of the present invention is, therefore, indicated by the appended claims rather than by the foregoing description. All changes which come within the meaning and range of equivalency of the claims are to be embraced within their scope.

What is claimed is:

1. A machine storage medium for performing a name search comprising instructions that upon execution cause a processor to:
   receive a name of a person;
   apply a plurality of fuzzy search rules to the name to generate name equivalents;
   apply a plurality of learned rules to the name equivalents to generate at least one stricken name equivalent and at least one non-stricken name equivalent, wherein the at least one stricken name equivalent has been previously rejected by a user;
   display the at least one stricken name equivalent and the at least one non-stricken name equivalent;
   receive a rejection for the at least one stricken name equivalent or the at least one non-stricken name equivalent; and
   modify at least one of the plurality of learned rules based on the rejection.

2. The storage medium of claim 1 further comprising instructions that upon execution cause the processor to store the name equivalents and corresponding rejection in a database.

3. The storage medium of claim 2 further comprising instructions that upon execution cause the processor to modify at least one of the plurality of rules based on the contents of the database.

4. The storage medium of claim 2 wherein the contents of the database are filtered.

5. The storage medium of claim 1 further comprising instructions that upon execution cause the processor to receive attributes of the name search.

6. The storage medium of claim 5 wherein the plurality of learned rules applied to the name depends on the attributes of the name search.

7. The storage medium of claim 1 further comprising instructions that upon execution cause the processor to display two or more learned rules from the plurality of learned rules.

8. The storage medium of claim 7 further comprising instructions that upon execution cause the processor to select at least one of the two or more learned rules.

9. The storage medium of claim 8 wherein the plurality of learned rules are modified based on the selection of at least one of the two or more learned rules.

10. A readable storage medium for training a computer to perform a fuzzy name search comprising instructions that upon execution cause the computer to:
    receive a name from a list of names;
    apply a plurality of fuzzy search rules to the name to generate name equivalents;
    apply a plurality of learned rules to the name equivalents to generate at least one stricken name equivalent and at least one non-stricken name equivalent, wherein the at least one stricken name equivalent has been previously rejected by a user;
    display the at least one stricken name equivalent and the at least one non-stricken name equivalent;
    accept or reject the at least one stricken name equivalent and the at least one non-stricken name equivalent; and
    modify the plurality of learned rules based on the accepting or rejecting.

11. The storage medium of claim 10 further comprising instructions that upon execution cause the computer to repeat the steps a pre-determined number of times.

12. The storage medium of claim 10 further comprising instructions that upon execution cause the computer to store the names and accepted or rejected name equivalents in a database.

13. The storage medium of claim 12 further comprising instructions that upon execution cause the computer to modify the plurality of learned rules based on the contents of the database.

14. The storage medium of claim 13 further comprising instructions that upon execution cause the computer to filter the contents of the database.

15. The storage medium of claim 1 further comprising instructions that upon execution cause the processor to:
   generate a plurality of training samples based on the rejection;
   generate a plurality of accuracy indices by applying a machine learning algorithm and a plurality of search rules to the plurality of training samples; and
   eliminate at least one stricken-name equivalent or at least one non-stricken name equivalent from the plurality of learned rules based on the plurality of accuracy indices.

16. The storage medium of claim 10 further comprising instructions that upon execution cause the computer to:
   generate a plurality of training samples based on the rejected stricken name equivalent and non-stricken name equivalent;
   generate a plurality of accuracy indices by applying a machine learning algorithm and a plurality of search rules to the plurality of training samples; and
   eliminate at least one stricken-name equivalent or at least one non-stricken name equivalent from the plurality of learned rules based on the plurality of accuracy indices.

* * * * *